United States Patent [19]

Klee et al.

[11] 3,840,094

[45] Oct. 8, 1974

[54] BRAKE MECHANISM FOR SKID STEER VEHICLE

[75] Inventors: Maurice Klee; Wayne G. Smith, both of Burlington, Iowa

[73] Assignee: J. I. Case Company, Racine, Wis.

[22] Filed: Mar. 16, 1973

[21] Appl. No.: 342,050

[52] U.S. Cl. .................. 188/31, 180/6.2, 180/72, 188/69, 305/9
[51] Int. Cl. .............................................. B60t 1/00
[58] Field of Search ............ 180/6.7, 6.2, 9, 62, 72; 305/9; 188/31, 69; 74/411.5

[56] References Cited
UNITED STATES PATENTS

| | | | |
|---|---|---|---|
| 3,093,212 | 6/1963 | McAfee et al. | 188/31 X |
| 3,371,735 | 3/1968 | Masera | 305/9 X |
| 3,704,757 | 12/1972 | Buress | 305/9 |

Primary Examiner—David Schonberg
Assistant Examiner—John A. Pekar
Attorney, Agent, or Firm—Dressler, Goldsmith, Clement & Gordon, Ltd.

[57] ABSTRACT

This invention relates to a brake for a skid steer vehicle that includes a sprocket having sprocket teeth defining part of the drive chain between a power source and a wheel. The brake mechanism consists of a roller that is supported on a lever which is movable towards the sprocket wheel to have the roller engage the sprocket teeth. Releasable lock means hold the lever in an engaged position with the roller in engagement with the sprocket. The roller is movable relative to the lever by the dimension of approximately one-half the pitch of the sprocket teeth so that the roller can fully engage the recesses between adjacent sprocket teeth for any angular position of the sprocket wheel.

9 Claims, 6 Drawing Figures

PATENTED OCT 8 1974　　　SHEET 1 OF 2　　　3,840,094

BRAKE MECHANISM FOR SKID STEER VEHICLE

BACKGROUND OF THE INVENTION

The present invention relates generally to vehicles and more particularly to an improved braking mechanism for skid-steer vehicles.

In recent years, a small wheel type vehicle has been developed wherein all four wheels of the unit are driven and the steering or turning movement is accomplished by driving the two pairs of wheels on opposite sides of the vehicle at different speeds in the same or opposite directions. The drive mechanism utilized for machines of this type normally includes identical drives for connecting each pair of wheels to the engine.

One type of drive mechanism that is presently being used in units of this type is a hydraulic system that includes a fixed or variable displacement motor and a fixed or variable displacement pump interposed between the engine and the wheels.

In units of this type, difficulties have been encountered in providing a reliable inexpensive brake mechanism that readily can be incorporated into the vehicle.

SUMMARY OF THE INVENTION

The present invention provides a simple and inexpensive brake mechanism that readily can be incorporated into existing machines and lock the wheels when it is engaged.

The braking mechanism is specifically adapted for drive mechanisms of the above type wherein the two wheels are connected to a fluid motor through drive chains and sprockets.

The braking mechanism of the present invention consists of a chain link that is supported on a lever pivoted adjacent one of the sprockets that is incorporated into the driving mechanism. The chain link has a pitch corresponding to the pitch of the sprocket teeth of the associated sprocket wheel and the link is movable on the lever a limited amount to allow the link to fully engage with the sprocket teeth for any angular position of the sprocket wheel.

In its broadest context, the sprocket wheel may be considered to be a disc that has circumferentially spaced projections on the periphery which defines circumferentially spaced recesses and the link has a complementary portion carried by the lever or support member to lock with the periphery of the disc in any angular position of the disc.

BRIEF DESCRIPTION OF THE SEVERAL VIEWS OF DRAWINGS

DETAILED DESCRIPTION

Figure 1:
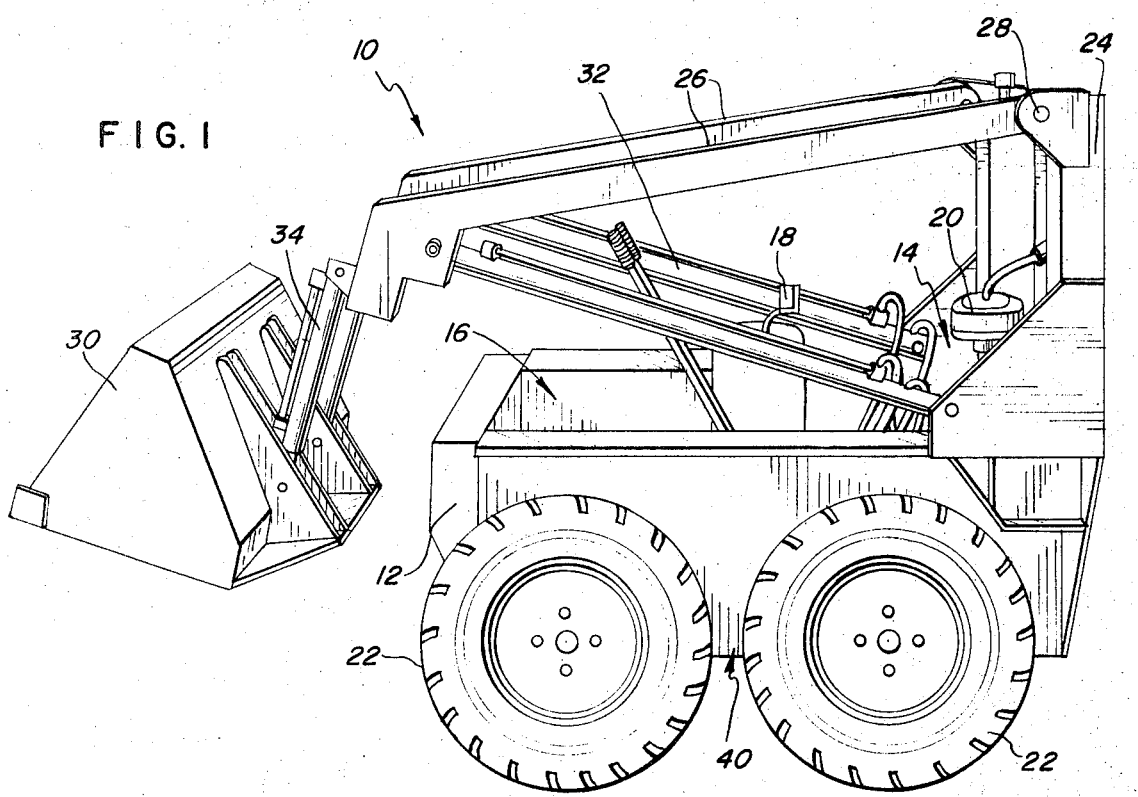
FIG. 1 is a perspective view of a vehicle having the present invention incorporated therein.

While this invention is susceptible of embodiment in many different forms, there is shown in the drawings and will herein be described in detail preferred embodiments, with the understanding that the present disclosure is to be considered as an exemplification of the principles of the invention and is not intended to limit the invention to the embodiments illustrated.

FIG. 1 of the drawings shows an overall construction of a skid-steer vehicle that may have the present invention incorporated therein. Vehicle 10 has an elongated generally U-shaped body 12 that defines an engine space 14 at one end thereof and a forward space 16 at the opposite end with a seat 18 located intermediate the ends. Engine 20 is located in the engine space 14 while forward space 16 is designed for the operator's legs.

Vehicle 10 further includes first and second pairs of wheels 22 (only one pair being shown), respectively located on the opposite sides of the body 12. Stanchions 24 project upwardly from the body on each side of the engine space and a lift arm 26 is connected by a pivot pin 28 to the upper end of each stanchion. The lift arms project forwardly adjacent opposite sides of the body and downwardly adjacent the forward end with material handling member 30, such as a bucket, pivotally connected to the ends of the respective lift arms. Hydraulic fluid rams 32 are associated with each of the lift arms to raise and lower the lift arms while fluid rams 34 cooperate with bucket 30 to pivot the bucket on the lift arms.

Body 12 has side compartments 40 located on opposite sides thereof which house the drive mechanisms for the respective pairs of wheels. The drive mechanism in either side compartment may take any number of forms. For example, a drive mechanism could be a clutch operated drive as shown in Juhl et al. U.S. Pat. No. 3,340,942, assigned to the assignee of the present invention. Alternatively, the drive mechanism could be what is referred to as a hydrostatic drive such as that shown in Bauer U.S. Pat. No. 3,635,365. In both types of drive mechanisms, the driving member (the hydraulic motor or the clutches) is connected to each of the wheels through an endless chain 42 entrained over sprockets 44 (only one being shown) connected to the respective wheels 22 and a further sprocket on the outlet of the drive member.

Figure 2:
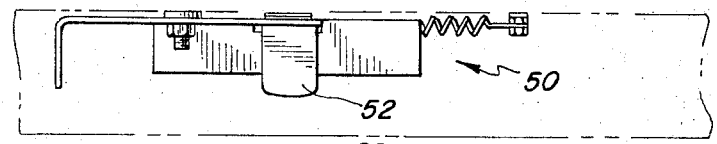
FIG. 2 is a plan view of the brake mechanism.
Figure 5:
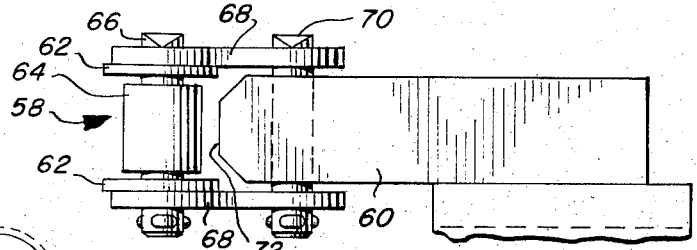
FIG. 5 is an end view of the elements shown in FIG. 4.
Figure 4:
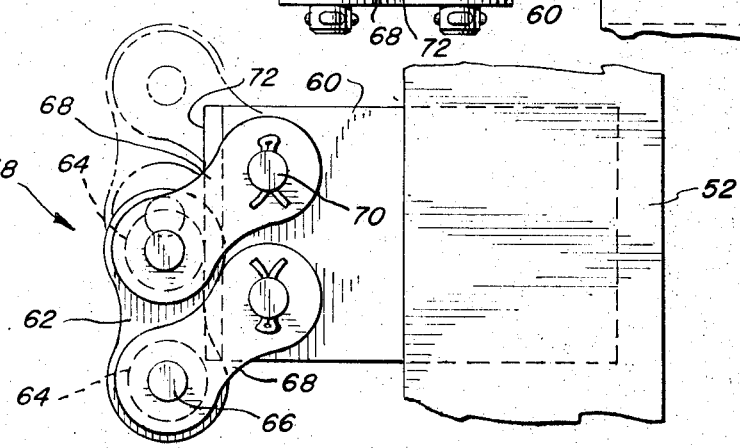
FIG. 4 is an enlarged side elevation view of a portion of the brake mechanism.
Figure 3:
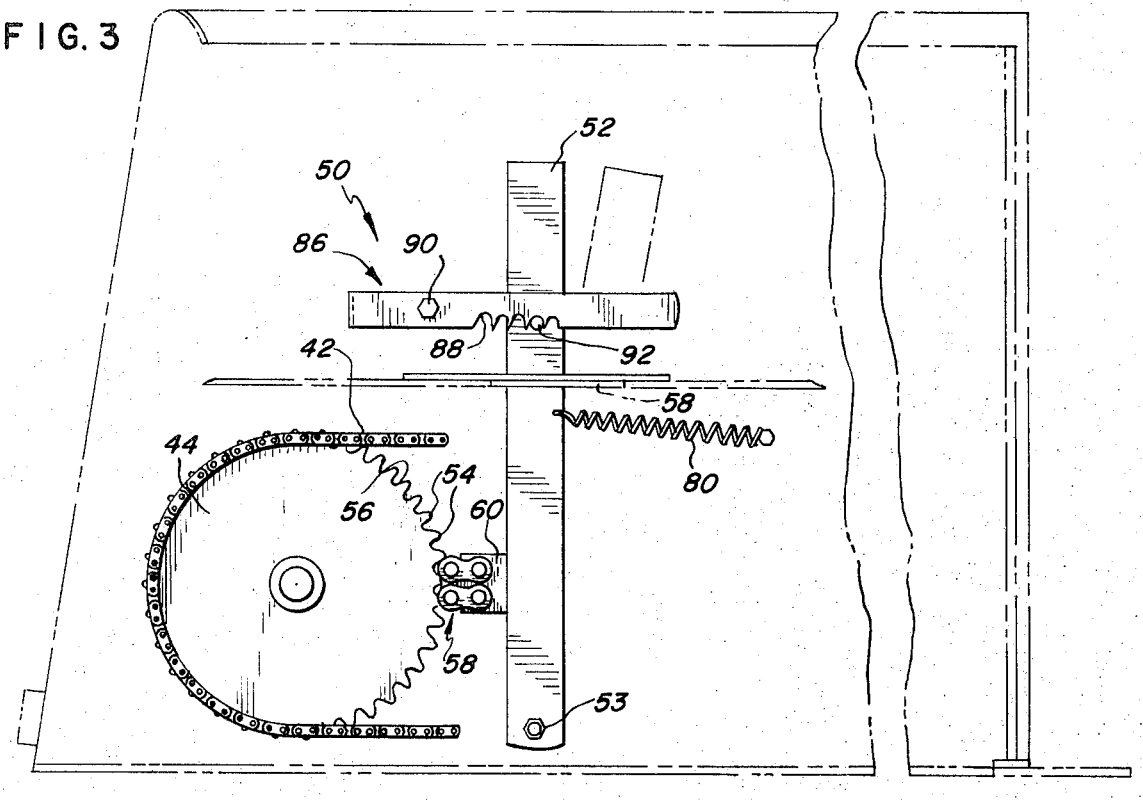
FIG. 3 is a side elevation view of the brake mechanism shown in FIG. 2.

According to the present invention, vehicle 10 incorporates brake means that will lock all of the wheels through a simple mechanism that includes a minimum number of parts. Brake means 50 for each pair of wheels is generally shown in FIGS. 2 and 3 while the details are shown in FIGS. 4 and 5. While it is only necessary to have one brake means for one set of wheels, in the specific embodiment illustrated, two brake means, which are identical in construction, cooperate with the respective pairs of wheels on opposite sides of the vehicle. Since the respective brake means are identical in construction, only one will be described in detail.

Referring to FIG. 3, brake means 50 includes a movable support or lever 52 that is pivotally supported on a pin 53 and has the major portion thereof located in the side compartment while the upper end of the lever extends through an opening 58 in the top of the side compartment for access by the operator.

The intermediate portion of support means or lever 52 is located adjacent disc or sprocket wheel 44 which has circumferentially spaced projections 54 on the periphery thereof that define circumferentially spaced recesses 56. In the specific type of sprocket wheel or disc 44 that is used in conjunction with a standard roller chain, the projections 54 define substantially cylindrical recesses 56.

The brake means further includes a complementary portion 58 that is carried by a support block 60 fixed to the lever 52. As most clearly shown in FIGS. 4 and 5, complementary portion 58 is in the form of a chain link that consists of a pair of links 62 that support spaced rollers 64 through pins 66. The pins 66 extend beyond the links 62 and have a further pair of links 68 supported thereon, the opposite ends of which are carried by pins 70 fixed to support block 60. Spaced rollers 54 have a size or diameter substantially equal to the pitch between sprocket projections or teeth 56, as is shown in FIG. 3.

As shown in FIGS. 4 and 5, support block 60 has a surface 72 adjacent the chain link or complementary portion 58 and links 68 have a length that is greater than the spacing between the surface and pins 70 so that surface 72 acts as a stop to define upper and lower limits of pivotal or relative movement of chain link 58 with respect to the block 60. In the specific embodiment illustrated, chain link 58 can be moved vertically relative to block 60 from the solid line position of FIG. 4 to the dotted line position and the limited relative movement is substantially equal to one-half of the pitch of the sprocket teeth on sprocket 44. This particular arrangement allows the respective rollers of chain link 58 to engage with adjacent pairs of recesses of sprocket wheel 44 while the sprocket wheel or disc is at any angular position.

According to a further aspect of the invention, support member or lever 52 is normally biased to a first released position through a spring or biasing means 80 and this first position may be defined by one end of opening 58 in the upper wall of side compartment 40. The brake means 50 also incorporates releasable lock means 86 that will retain the support means or lever in a second or locked position to hold the chain link 58 in engagement with the recesses 56 defined by teeth or projections 54. The releasable lock means 86 has been illustrated as an arm or member that has a plurality of recesses 88 and is pivoted on a pin 90. The recesses 88 are adapted to receive a pin 92 carried by lever 52.

Summarizing the brake means briefly, when the lever is in the first released position shown in phantom line of FIG. 3, the complementary portion of chain link 58 assumes the solid line position shown in FIG. 4. Movement of the lever towards the disc or sprocket wheel 44 will cause the rollers 64 to engage with adjacent recesses 56 and the final position of the rollers 64 and links 68 will be dependent upon the angular position of sprocket wheel 44. However, since chain link 58 is capable of being moved on lever 52 by dimension at least equal to one-half of the pitch of the sprocket teeth, the rollers of chain link 58 can fully engage with the substantially cylindrical recesses 56 for any position of the sprocket wheel.

Of course, the releasable lock means 86 is freely pivoted on pin 90 so that pin 92 will slide along the lower surface of arm 86 and the configuration of the recesses 88 will allow the pin to move in and out of the respective recesses while the lever 52 is being pivoted in a counterclockwise direction, as viewed in FIG. 3. When the rollers of chain link 58 are in the fully engaged position with recesses 56, the pin 92 will be in one of the recesses 88 to positively hold the chain link in the engaged position with respect to the sprocket wheel 44.

Figure 6:
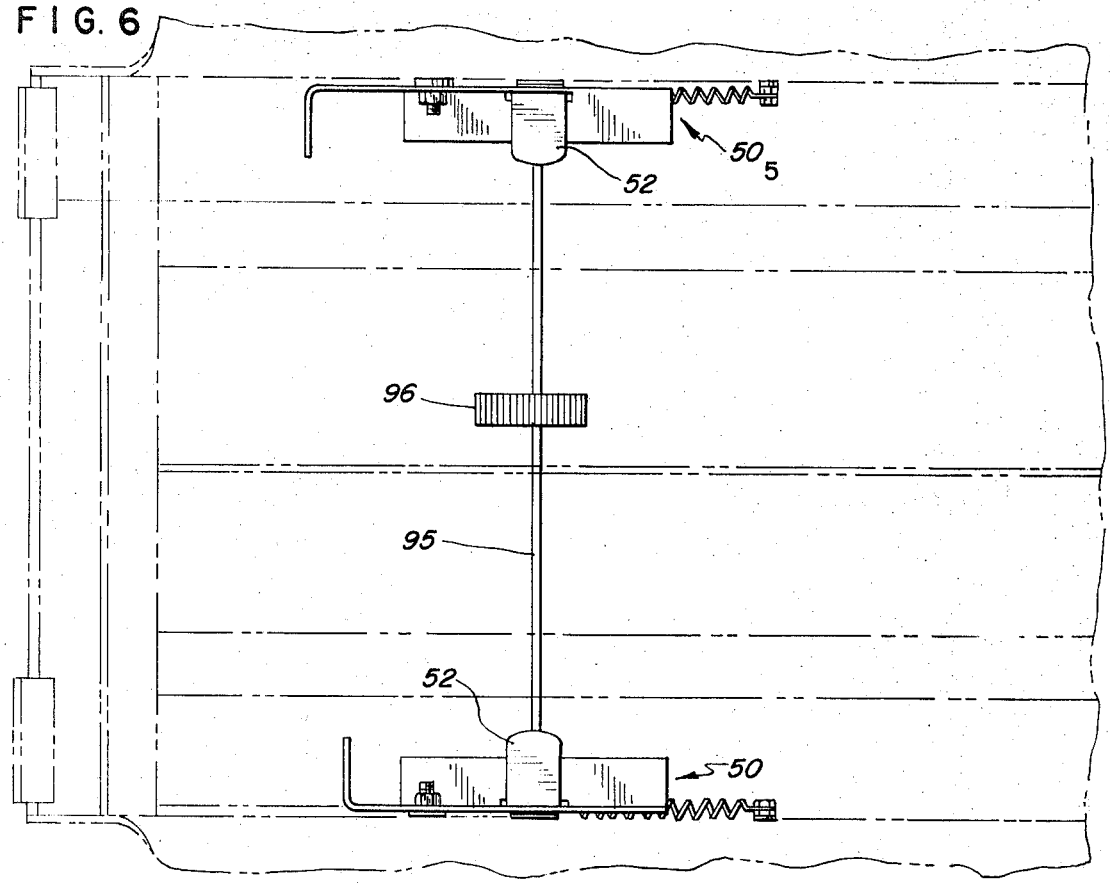
FIG. 6 is a plan view showing two interconnected mechanisms.

According to a further aspect of the invention, it might be desirable to be able to simultaneously actuate both brakes by a single member. This can readily be accomplished by interconnecting the two levers 52 of the respective brake means 50 on opposite sides of the vehicle, through a rod 95 that has a foot pedal or other device carried thereon. With the arrangement shown in FIG. 6, the operator need only press on foot pedal 96, which is located in the forward compartment 16 of the vehicle, to simultaneously pivot both levers and cause the respective chain links 58 to engage respective sprocket wheels cooperating with the front wheels of the vehicle.

While the movement of the support member or lever 52 has been shown as being manually operable, any other type of mechanical arrangement could readily be incorporated into the brake means without departing from the spirit of the invention.

What is claimed is:

1. In a vehicle having a body supported on wheels; drive means for said wheels, said drive means including at least one sprocket connected to a wheel, said sprocket having sprocket teeth on the periphery thereof; and brake means for said vehicle, said brake means including movable support means adjacent said sprocket; a roller; link means pivotally supporting said roller on said support means, said roller having a size equal to substantially the pitch of said sprocket teeth so that movement of said support means toward said sprocket wheel will cause said roller to engage said sprocket between adjacent sprocket teeth; and releasable lock means for retaining said support means to hold said roller in engagement with said teeth.

2. A vehicle as defined in claim 1, in which said roller is supported on said support means for limited relative movement by a dimension of substantially one-half of the pitch of said sprocket teeth so that said roller may engage said teeth in any angular position of said sprocket.

3. A vehicle as defined in claim 2, in which said support means includes a lever pivoted on said body with biasing means normally biasing said lever to a first released position.

4. A vehicle as defined in claim 3, in which said body has two pairs of wheels respectively located on opposite sides thereof and in which at least one wheel on each side of said body has a sprocket connected thereto and in which the respective sprockets each have one of said brake means associated therewith.

5. A vehicle as defined in claim 4, further including means cooperating with said levers to simultaneously move said levers from said first released position.

6. A vehicle as defined in claim 2, in which said support means has a surface adjacent said roller and in which said link means includes a pair of links that extend beyond said surface and are freely pivoted on pivot pins carried by said lever, said links having a length greater than the spacing between said surface and said pins so that said surface acts as a stop to define the limits of relative movement of said roller.

7. In a vehicle having a body and wheels supporting said body, a disc cooperating with one wheel and having circumferentially spaced projections on the periphery thereof defining circumferentially spaced recesses on said disc; and brake means cooperating with said disc, said brake means including a support member, said support member being movable toward and away from the periphery of said disc, a link freely pivoted on said support member by a pin; a roller supported by said link for engaging the periphery of said disc during movement of said support member toward said disc, said roller being movable relative to said support member to engage and lock with the periphery of said disc in any angular position of said disc; and stop means on said support member defining the limits of pivotal movement of said link relative to said support member.

8. A vehicle as defined in claim 7, in which adjacent pairs of projections define substantially cylindrical recesses and said roller engages with said recesses.

9. A vehicle as defined in claim 7, in which said support member has a surface between said roller and said pin which surface defines said stops for said roller.

* * * * *